US008826277B2

(12) United States Patent
Chang et al.

(10) Patent No.: US 8,826,277 B2
(45) Date of Patent: Sep. 2, 2014

(54) CLOUD PROVISIONING ACCELERATOR

(75) Inventors: Rong N. Chang, Pleasantville, NY (US);
Mihwa Choi, Cambridge, MA (US);
Yexi Jiang, Miami, FL (US); Meir Laker, Hawthorne, NY (US);
Chang-Shing Perng, Goldens Bridge, NY (US); Hidayatullah H. Shaikh, Shrub Oak, NY (US); Edward C. So, Flushing, NY (US); Tao Tao, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 13/306,506

(22) Filed: Nov. 29, 2011

(65) Prior Publication Data

US 2013/0139152 A1    May 30, 2013

(51) Int. Cl.
  *G06F 9/46*     (2006.01)
  *G06F 7/00*     (2006.01)
  *G06F 9/455*    (2006.01)
  *G06F 17/20*    (2006.01)

(52) U.S. Cl.
  CPC ............................... *G06F 9/45545* (2013.01);
                                *G06F 17/20* (2013.01)
  USPC .............................................. 718/1; 707/602

(58) Field of Classification Search
  CPC ............................ G06F 9/45545; G06F 17/20
  USPC .............................................. 718/1; 707/602
  See application file for complete search history.

(56) References Cited

U.S. PATENT DOCUMENTS

| 7,996,525 | B2 | 8/2011 | Stienhans | |
|---|---|---|---|---|
| 2003/0149685 | A1 | 8/2003 | Trossman | |
| 2008/0271038 | A1 | 10/2008 | Rolia | |
| 2009/0235268 | A1 | 9/2009 | Seidman | |
| 2009/0313620 | A1 | 12/2009 | Sedukhin | |
| 2010/0083248 | A1* | 4/2010 | Wood et al. | 718/1 |
| 2010/0088150 | A1 | 4/2010 | Mazhar | |
| 2010/0100877 | A1 | 4/2010 | Greene | |
| 2010/0199285 | A1 | 8/2010 | Medovich | |
| 2010/0281478 | A1 | 11/2010 | Sauls | |
| 2010/0325191 | A1* | 12/2010 | Jung et al. | 709/202 |
| 2013/0111476 | A1* | 5/2013 | Medovich | 718/1 |

OTHER PUBLICATIONS

Thomas M. Kroeger, et al. "The Case for Efficient File Access Pattern Modeling". Supported in part by the National Science Foundation under Grant CCR-9704347, the USENIX Association and Office of Naval Research under Grant N00014-92-J-1807. 1999.

James Griffioen, et al. "Reducing File System Latency using a Predictive Approach". This paperalso appearedin the Proceedingsof the 1994Summer USENIX Conference. This workwas supported in part by NSF grant No. CCR-9309176. Jun. 1994.

Yinglung Liang, et al. "Failure Prediction in IBM BlueGene/L Event Logs". Seventh IEEE International Conference on Data Mining,1550-4786/07 2007 IEEE.

(Continued)

*Primary Examiner* — Camquy Truong
(74) *Attorney, Agent, or Firm* — Louis J. Percello; Otterstedt, Ellenbogen & Kammer, LLP

(57) ABSTRACT

High level characteristics are extracted from a virtual machine provisioning request stream for a cloud computing environment. A plurality of prediction models are generated for a plurality of different types of virtual machines. A regression-correlation ensemble is applied to appropriate ones of the prediction models to predict future virtual machine demand for the cloud computing environment.

18 Claims, 18 Drawing Sheets

(56) References Cited

OTHER PUBLICATIONS

Cândida Ferreira, "Gene Expression Programming: A New Adaptive Algorithm for Solving Problems". Complex Systems, vol. 13, issue 2: 87-129, 2001.

Jerome T. Connor, et al. "Recurrent Neural Networks and Robust Time Series Prediction". IEEE Transactions on Neural Networks, vol. 5, No. 2, Mar. 1994.

Francois Labonte, "A Stream Virtual Machine". Doctoral Dissertation, Stanford University, Jun. 2008.

Alex J. Smola, et al. "A tutorial on support vector regression". Statistics and Computing 14: 199-222, 2004.

Avrim L. Blum, "On-Line Algorithms in Machine Learning". This paper is based on a survey talk presented at the Jun. 1996 Dagstuhl workshop on On-Line algorithms. Jul. 1997.

Debprakash Patnaik, et al. "Sustainable Operation and Management of Data Center Chillers using Temporal Data Mining". KDD'09, Jun. 28-Jul. 1, 2009, Paris, France.

Wei Xu, et al. "Detecting Large-Scale System Problems by Mining Console Logs". SOSP'09, Oct. 11-14, 2009, Big Sky, Montana, USA.

Albert Greenberg, et al. "The Cost of a Cloud:Research Problems in Data Center Networks". ACM SIGCOMM Computer Communication Review, vol. 39, No. 1, Jan. 2009.

Wei Peng, et al. "Event Summarization for System Management". KDD'07, Aug. 12-15, 2007, San Jose, California, USA.

Zhenhuan Gong, et al. "PRESS: PRedictive Elastic ReSource Scaling for cloud systems". ICNSM 2009.

Jerry Kiernan, et al. "Constructing comprehensive summaries of large event sequences". ACM Transactions on Computational Logic, vol. 2, No. 3, Sep. 2001, pp. 111-140.

Peng Wang, et al. "An Algorithmic Approach to Event Summarization". SIGMOD'10, Jun. 6-11, 2010, Indianapolis, Indiana, USA.

Peter Mell et al., The NIST Definition of Cloud Computing, National Institute of Standards and Technology, Oct. 7, 2009.

Time series, Wikipedia, downloaded from //en.wikipedia.org/wiki/Time_series on Mar. 31, 2014.

Georg Dorfner, Neural Networks for Time Series Processing, Neural Network World, 1996.

IBM Smart Cloud Web Site as of Jun. 12, 2011, downloaded Mar. 31, 2014 from http://web.archive.org/web/20110612040914-935.ibm.com/services/us/igs/cloud-development/.

Simon M. Potter, Nonlinear Time Series Modelling: An Introduction, Fed. Res. Bank of NY, Aug. 1999.

Thomas M. Kroeger and Darrel D.E. Long. Design and implementation of a predictive file prefetching algorithm. In USENIX, 2001, Jun. 25-30, 2001.

Statistics, Wikipedia, downloaded from //en.wikipedia.org/wiki/Statistics on Mar. 31, 2014.

\* cited by examiner

| NOTATION | DEFINITION |
|---|---|
| $v(t)/\hat{v}(t)$ | THE REAL/PREDICTED DEMANDS OF VMs AT TIME $t$ |
| $T(v(t), \hat{v}(t))$ | THE COST FUNCTION OF SERVICE QUALITY |
| $R(v(t), \hat{v}(t))$ | THE COST FUNCTION OF IDLED RESOURCE |
| $T_{hit}/T_{miss}$ | THE PROVISIONING TIME FOR A PREPARED/NON-PREPARED VM |
| $R_{vm}$ | THE RESOURCE COST OF A VM IN A UNIT TIME |
| $\beta$ | THE WEIGHT OF SERVICE QUALITY COST IN TOTAL COST |

*FIG. 6*
NOTATIONS OF CLOUD PREDICTION COST

| PREDICTION METHOD | DESCRIPTION |
|---|---|
| MOVING AVERAGE | NAIVE |
| AUTO REGRESSION | LINEAR REGRESSION |
| ARTIFICIAL NEURAL NETWORK | NON-LINEAR REGRESSION |
| SUPPORT VECTOR MACHINE | LINEAR LEARNER WITH NON-LINEAR KERNEL |
| GENE EXPRESSION PROGRAMMING | HEURISTIC ALGORITHM |

*FIG. 7*
TIMES SERIES PREDICTION ALGORITHMS

CHARACTERISTICS FOR VM DEMAND TIME SERIES

| MEASUREMENT | WEEKLY | DAILY | HOURLY |
|---|---|---|---|
| COEFFICIENT OF VARIANCE | 0.5606 | 0.7915 | 1.2249 |
| SKEWNESS | 0.3295 | 1.5644 | 5.4464 |
| KURTOSIS | 1.62 | 5.8848 | 52.4103 |

CDF OF VM TYPES

ORDERING TYPES BY FREQUENCY

FIG. 13

THE COST OF PREDICTION ALGORITHMS UNDER DIFFERENT MEASUREMENTS

| PREDICTOR | 1st VM TYPE /1302 | | | 2nd VM TYPE /1304 | | | 3rd VM TYPE /1306 | | | AVG. TOP 12 /1308 |
|---|---|---|---|---|---|---|---|---|---|---|
| | MAE | MSE | MAPE | CPC | MAE | MSE | MAPE | CPC | MAE | MSE | MAPE | CPC | CPC |

| PREDICTOR | MAE | MSE | MAPE | CPC | MAE | MSE | MAPE | CPC | MAE | MSE | MAPE | CPC | CPC |
|---|---|---|---|---|---|---|---|---|---|---|---|---|---|
| MA | 40.3 | 2740.23 | 0.87 | 437305 | 51.53 | 4904.4 | 1.63 | 532132.5 | 7.23 | 88.5 | 1.67 | 76370 | 152402.29 |
| AR | 45.1 | 4034.57 | 1.52 | 300687.5 | 50.5 | 3893.63 | 5.32 | 391630 | 5.9 | 67.5 | 1.05 | 83292.5 | 137046.67 |
| ANN | 30.27 | 1203.07 | 0.67 | 388535 | 20.8 | 706.4 | 2.04 | 247085 | 4.97 | 29.57 | 2.14 | 37052.5 | 106113.96 |
| GEP | 17.37 | 1757.5 | 0.21 | 154440 | 54.77 | 5621.97 | 6.59 | 473347.5 | 4.1 | 27.63 | 1.59 | 33745 | 112149.79 |
| SVM | 68.03 | 5604.77 | 0.9 | 1010422.5 | 59.5 | 5578.37 | 2.89 | 890447.5 | 6.2 | 85.4 | 0.9 | 88737.5 | 234225.83 |
| ENSEMBLE | 16.7 | 1212.1 | 0.21 | 158862.5 | 21.67 | 1057 | 2.04 | 254190 | 5.03 | 46.97 | 1.56 | 53327.5 | 88679.79 |

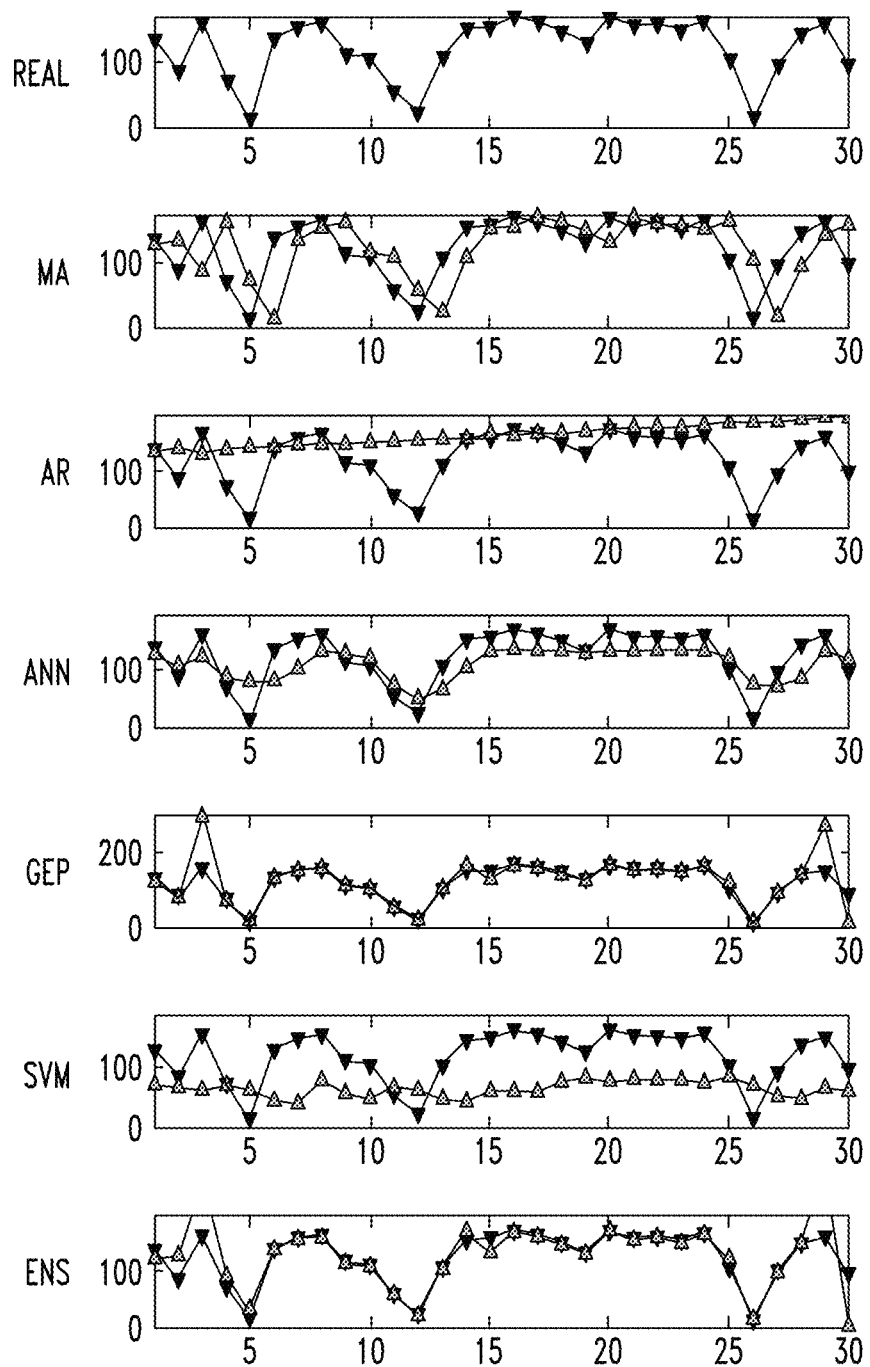

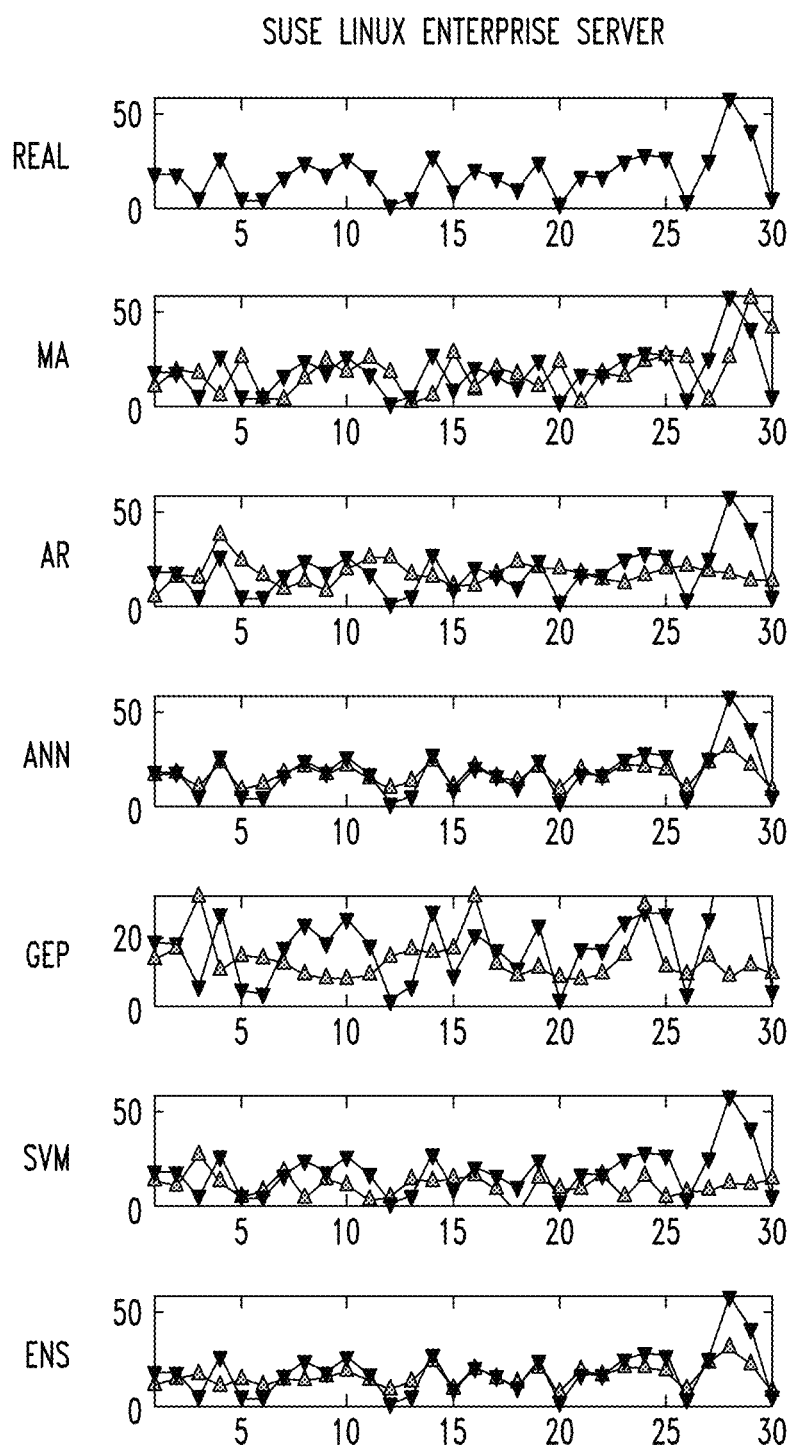

FIG. 15

WAITING TIME REDUCTION AND RESOURCE WASTE OF PREDICTOR GUIDED BY DIFFERENT COST MEASUREMENTS

| TIME REDUCTION | AVERAGE TIME REDUCTION | AVERAGE RESOURCE WASTE |
|---|---|---|
| MAE | 81.77% | 28300 |
| MSE | 80.13% | 37100 |
| MAPE | 79.01% | 33133 |
| CPC | 83.79% | 38533 |

FIG. 16

PROVISIONING TIME REDUCTION BY INCORPORATING RESERVATION CONTROLLER

| VM TYPE | 1 | 2 | 3 | 4 | 5 | 6 |
|---|---|---|---|---|---|---|
| REDUCTION | 97.77% | 91.58% | 96.81% | 96.26% | 96.76% | 91.67% |
| VM TYPE | 7 | 8 | 9 | 10 | 11 | 12 |
| REDUCTION | 98.17% | 94.37% | 99.56% | 85.35% | 84.98% | 97.45% |

THE EFFECT OF $\beta$

CLOUD PROVISIONING ACCELERATOR

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to cloud computing and the like.

BACKGROUND OF THE INVENTION

Cloud computing seeks to provide computing resources on demand when they are needed. State-of-art virtual machine (VM) provisioning technology can provision a VM in tens of minutes.

SUMMARY OF THE INVENTION

Principles of the invention provide techniques for a cloud provisioning accelerator. In one aspect, an exemplary method includes the steps of extracting high level characteristics from a virtual machine provisioning request stream for a cloud computing environment; generating a plurality of prediction models for a plurality of different types of virtual machines; and applying a regression-correlation ensemble to appropriate ones of the prediction models to predict future virtual machine demand for the cloud computing environment.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein. Techniques of the present invention can provide substantial beneficial technical effects. For example, one or more embodiments may provide one or more of the following advantages:

ability for cloud users to obtain virtual machines for instant and urgent capacity needs which happen when computing workload increases (e.g. more clicks and/or transactions on a website).

ability for cloud providers to schedule provisioning related work in off-peak times and reduce the need for stand-by labor.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 includes a table of notation for a simple cost function for prediction quality, according to an aspect of the invention;

FIG. 7 lists exemplary prediction techniques, according to an aspect of the invention;

FIGS. 12A and 1213 depict average provisioning time reduction and average resource waste;

FIG. 13 presents a table showing the precision of all the predictors on all the time series;

FIGS. 14A-14C display the real time series of the three most frequent VM types and the corresponding prediction results of all the predictors;

FIG. 15 presents a table showing the time reduction and the idled resources of the ensemble predictor guided by various cost measurements;

FIG. 16 presents a table showing the ratio of provisioning time reduction that can be achieved by incorporating the reservation controller;

DETAILED DESCRIPTION OF PREFERRED EMBODIMENTS

Figure 1:
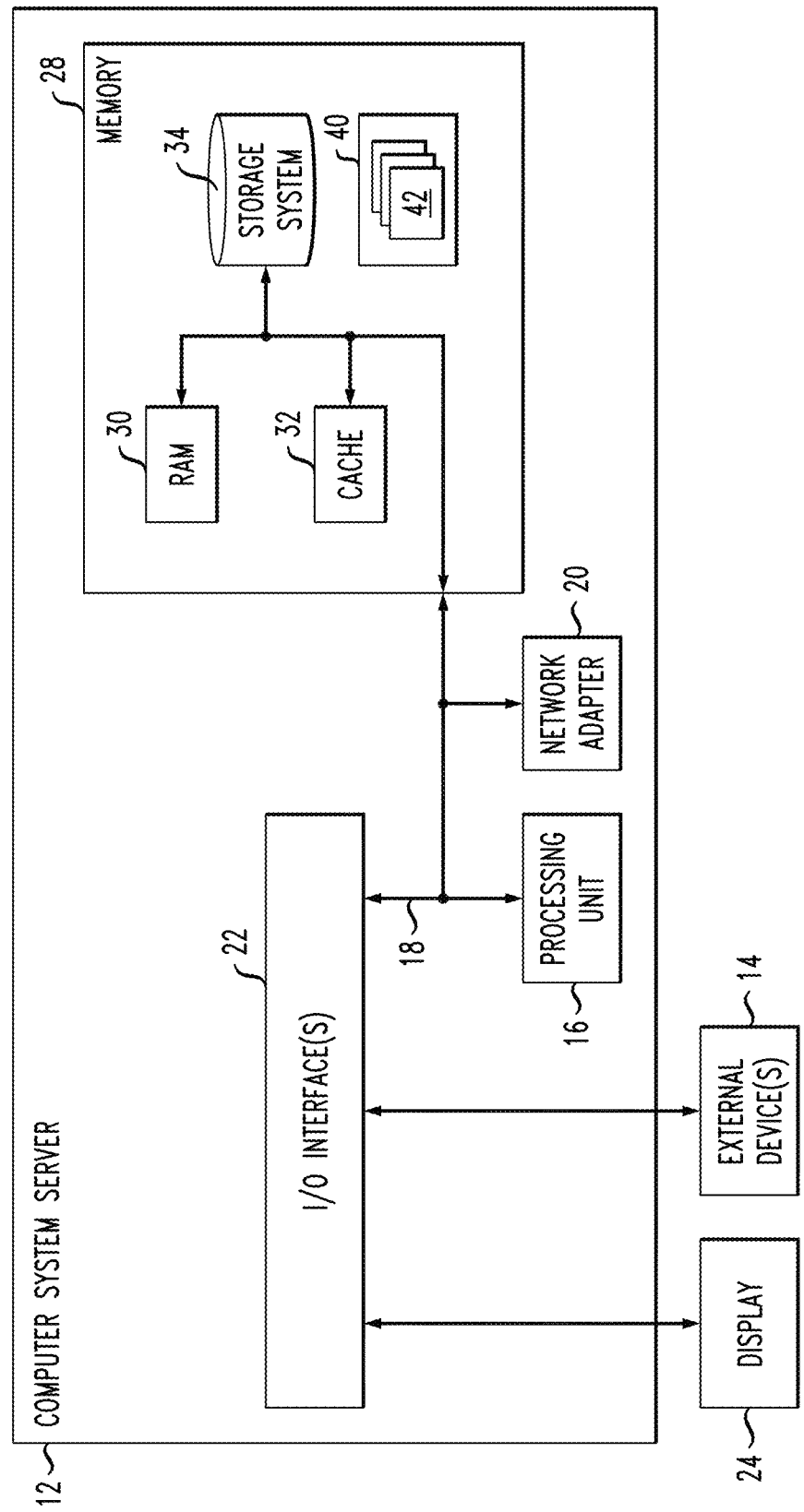
FIG. 1 depicts a cloud computing node according to an embodiment of the present invention.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
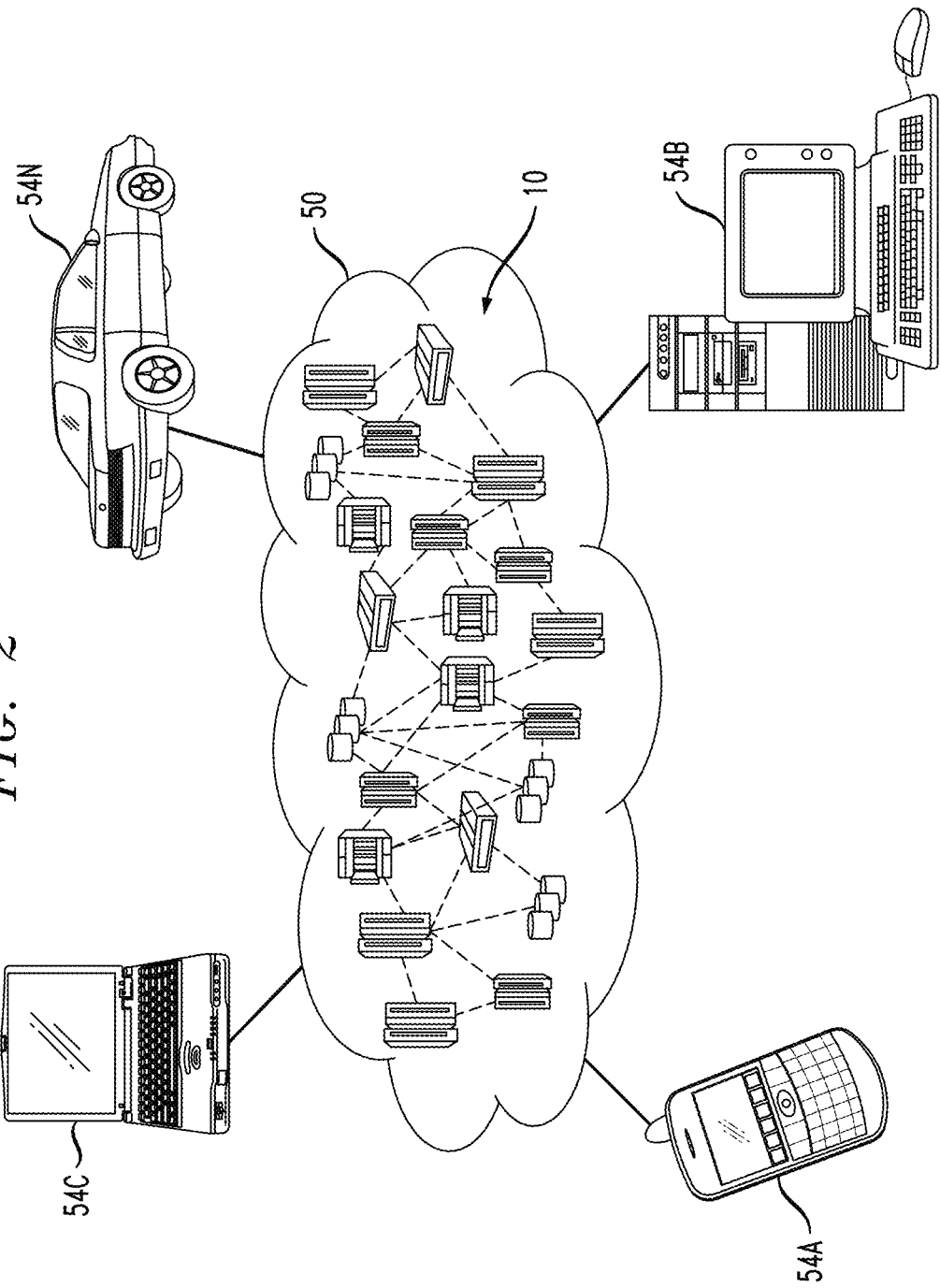
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
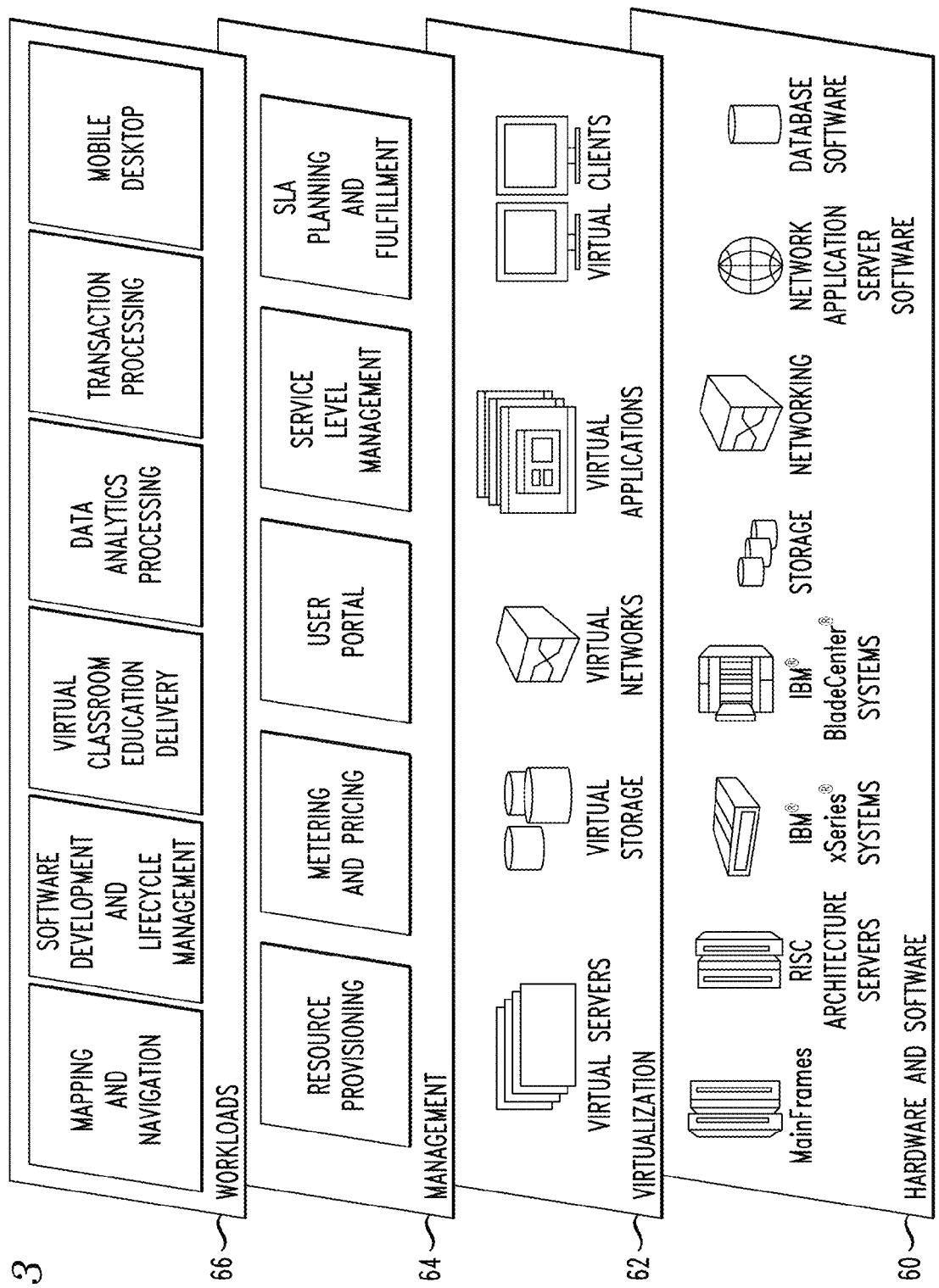
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

One or more embodiments advantageously provide a self-adaptive prediction system for instant cloud resource demand provisioning. The promise of cloud computing is to provide computing resources instantly whenever they are needed. As noted above, state-of-art virtual machine (VM) provisioning technology can provision a VM in tens of minutes. This latency may be satisfactory for non-urgent jobs but it is unacceptable for jobs that need to scale out during computation. The emerging techniques of VM streaming may further reduce the latency but are still subject to physical limitations of network and storage. To truly enable on-the-fly scaling, new VMs need to be ready in seconds upon request. In one or more embodiments, this is achieved by predicting the demand and preparing VMs in advance.

One or more embodiments provide an online temporal data mining system to model and predict cloud VM demands. One or more embodiments aim to extract high level characteristics from the VM provisioning request stream and notify the provisioning system to prepare VMs for incoming requests in advance. Instead of using traditional statistical goodness measurement, one or more embodiments utilize cloud prediction cost which encodes the true cost and constraints of the cloud to guide the training of prediction algorithms. Such measurement, in at least some instances, is believed to be better than traditional regression measurements. Moreover, one or more embodiments employ a two level ensemble method to capture the characteristics of the high transient demands time series. Experimental results using historical data from a cloud in operation demonstrate that one or more embodiments are capable of reducing 80% of the provisioning time on average and hence significantly improve the cloud service quality and provide possibility for on-the-fly provisioning.

Cloud computing is gradually becoming a ubiquitous choice for modern information technology (IT) solution of business activities. Compared with a traditional autonomic computing data center, the infrastructure as a service (IaaS) paradigm of cloud computing service is a more elastic and economical choice for business IT support. Currently, computing resources customers (companies, scientific institutions, and the like) can conveniently ask for computing resources from cloud service providers such as IBM, Amazon, and Microsoft, whenever there is a need.

One of the concerns that hampers the further popularization of cloud computing is the waiting time of VM provisioning. State-of-art VM provisioning technology costs tens of minutes on average to provision a VM. Since computing resources cannot be instantly ready in a cloud, some IT enterprise customers still prefer over-capacitated traditional data centers for time-sensitive computing, even with a huge overhead cost for the hardware, infrastructure, maintenance, and energy. Such hesitation from customers shows that there is still a significant gap in providing instant resource provisioning.

From the perspective of hardware and software technologies, there is currently little hope to immediately and significantly reduce the VM provisioning time. Cloud oriented hardware architecture can only slightly increase the efficiency of provisioning. The technology of streaming VM allows the customer to preview the VM before it is entirely ready. Moreover, since it is not instantly available until a great enough proportion of the VM is ready, there will be some time before this technology can fully answer the needs of instant provisioning.

From the business perspective, a simple yet straightforward solution is to ask all the customers to provide future VM provisioning requests schedules so the cloud service provider can prepare all the VMs ahead of time. However, this is impossible for many reasons:

(1) The customers have no obligation to, and are usually unwilling to, inform the cloud service provider when they will need more resources in the future.

(2) The customers themselves are unable to know when the computing resources are needed as the incoming workload is generally not predictable.

(3) The constituents of customers are always changing.

(4) For customers who do provide the requests schedule, their actual requests may change.

Facing these technology limitations and business constraints, one or more embodiments provide a practical, achievable and effective solution to provide an instant cloud by predicting the demand and preparing the VMs in advance.

Cloud resource prediction is a very challenging task due to the unbalanced demand distribution, dynamic changing requests, and continuous customer turnover. Our empirical studies show that applying traditional time series prediction techniques on cloud resource provisioning cannot achieve acceptable performance. Moreover, traditional prediction techniques are unable to dynamically change the prediction strategy according to the actual cloud environment. One or more embodiments provide a self-adaptive prediction system for cloud VM demands to meet the requirements of instant provisioning. One or more embodiments provide a real-time processing system that is able to incrementally learn and capture the up-to-date characteristics of VM demands over time. In one or more embodiments, a novel measurement called cloud prediction cost (CPC) is employed to guide the training procedure of prediction algorithms and utilize a two-level ensemble method to combine the prediction results under the guide of CPC. A series of experiments were conducted on the real data collected from the IBM Smart Cloud Enterprise (SCE) platform, which provide useful insights on data filtering and aggregation for resource provisioning. One or more embodiments develop advanced data mining techniques for instant cloud resource provisioning.

It is to be emphasized that experimental results and/or statements quantifying improvements compared to the prior art, as presented herein, are illustrative of one or more embodiments and non-limiting; other embodiments may achieve different results and/or different levels of improvement.

By way of a brief review and outline of additional material to be discussed herein:

1) One or more embodiments employ a novel measurement called Cloud Prediction Cost in the context of cloud service to evaluate the quality of the prediction results. Cloud Prediction Cost is an asymmetric cost measurement that treats the cost of under-prediction and over-prediction differently.

2) One or more embodiments provide a two-level ensemble algorithm for cloud VM demand prediction, where the first level combines the prediction results across different algorithms and the second level calculates a more robust prediction result by incorporating the time series correlation information.

3) One or more embodiments provide a three-module system to predict the multi-type VM demands based on the request history.

4) Results of a series of experiments on real data are provided, which demonstrate that Cloud Prediction Cost is capable to guide the prediction procedure and/or that one or more exemplary systems in accordance with one or more aspects of the invention are able to significantly reduce the average provisioning time while also successfully controlling the workload of resources.

Cloud Resource Provisioning

In the IBM Smart Cloud Enterprise (SCE) platform, each VM request includes 21 features such as Customer ID, VM Type, Request Start Time, and the like. For illustrative purposes, the instant specification focuses on the aggregated time series on features VAI type and request time.

Challenges typically noted in VM demand prediction can be described as per the below:

1) Given a requests record stream S, an efficient and proper mechanism is required to properly extract the high level aggregated information from the stream and transform the same into multiple time series $T=(T_1, T_2, \ldots, T_k)$, one for each image type.
2) Getting the time series set T, a model selection and training mechanism is required to accurately, periodically and timely generate the corresponding prediction models P.
3) Acquiring the up-to-date prediction model set P, an effective and accurate time series predictor is required to predict the amount of demands of time $t_{n+1}$ based on historical request records.

Figure 4:
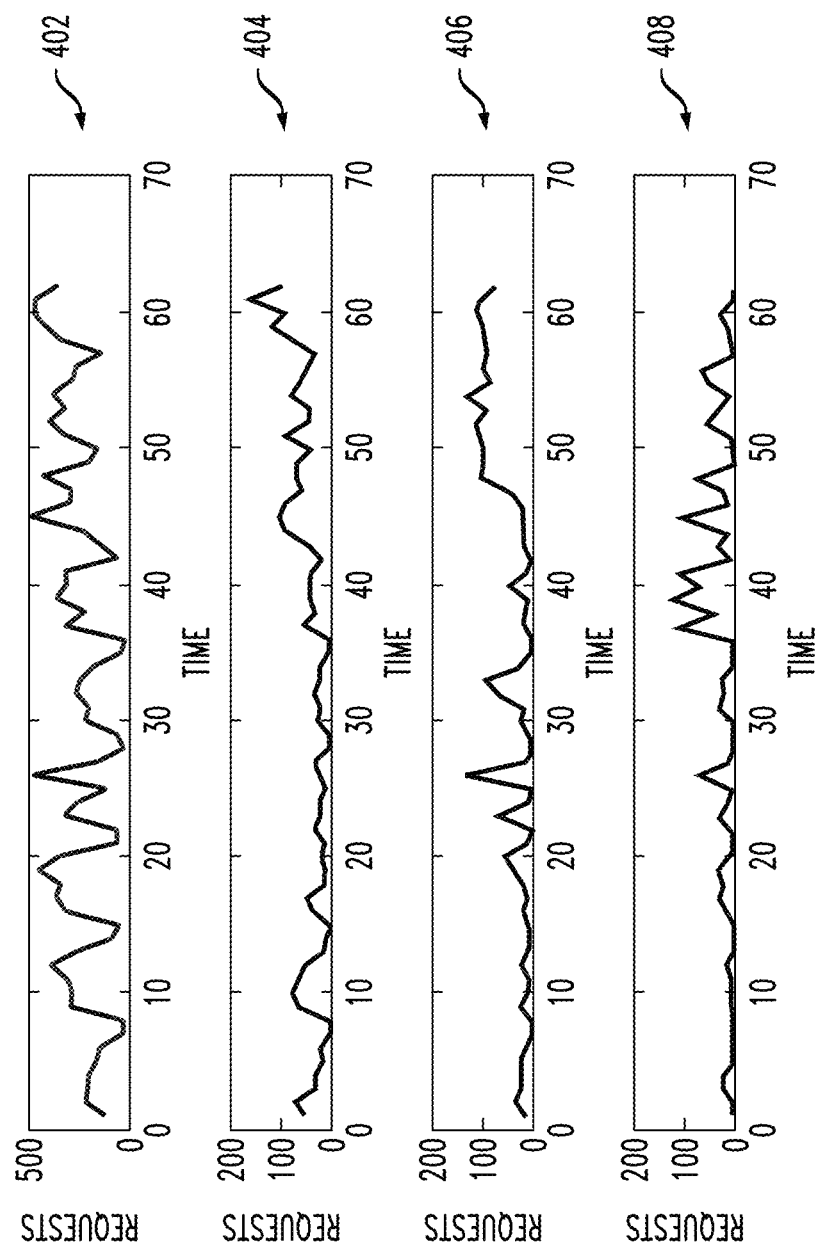
FIG. 4 shows exemplary time series of VM demands over time.

FIG. 4 shows exemplary time series of VM demands over time. The top time series 402 illustrates the demands of all VM types, while the bottom three time series 404, 406, 408 illustrate the time series of the three most demanded image types. Data in FIG. 4 is normalized.

The time series 402 of the total demand reflects a clear weekly demand change period and its characteristic(s) can be easily captured by prediction algorithms. However, modeling and predicting the total demand brings no help to the reduction of provisioning time, since all the provisioning is associated with the VM types. When the requests are decomposed by VM types, the time series with distinct VM types (e.g. the bottom 3 time series 404, 406, 408 in FIG. 1) become very irregular.

Through experimental study, we have found the following difficulties typically encountered in one or more instances where it is desired to carry out VM request prediction:
1) The distributions of different VM types' demands are heavily unbalanced. Moreover, the distribution changes tremendously over time.
2) In the presence of dynamic varying customer group, for long-term perspective, some of the time series contain random factors that can mislead the prediction algorithms.
3) There are a variety of different types of time series with quite different characteristics. No single existing prediction algorithm is able to perform well on all of these time series.

As a result, the requests prediction tasks are not as simple as a straightforward time series prediction task.

System Framework

Figure 5:
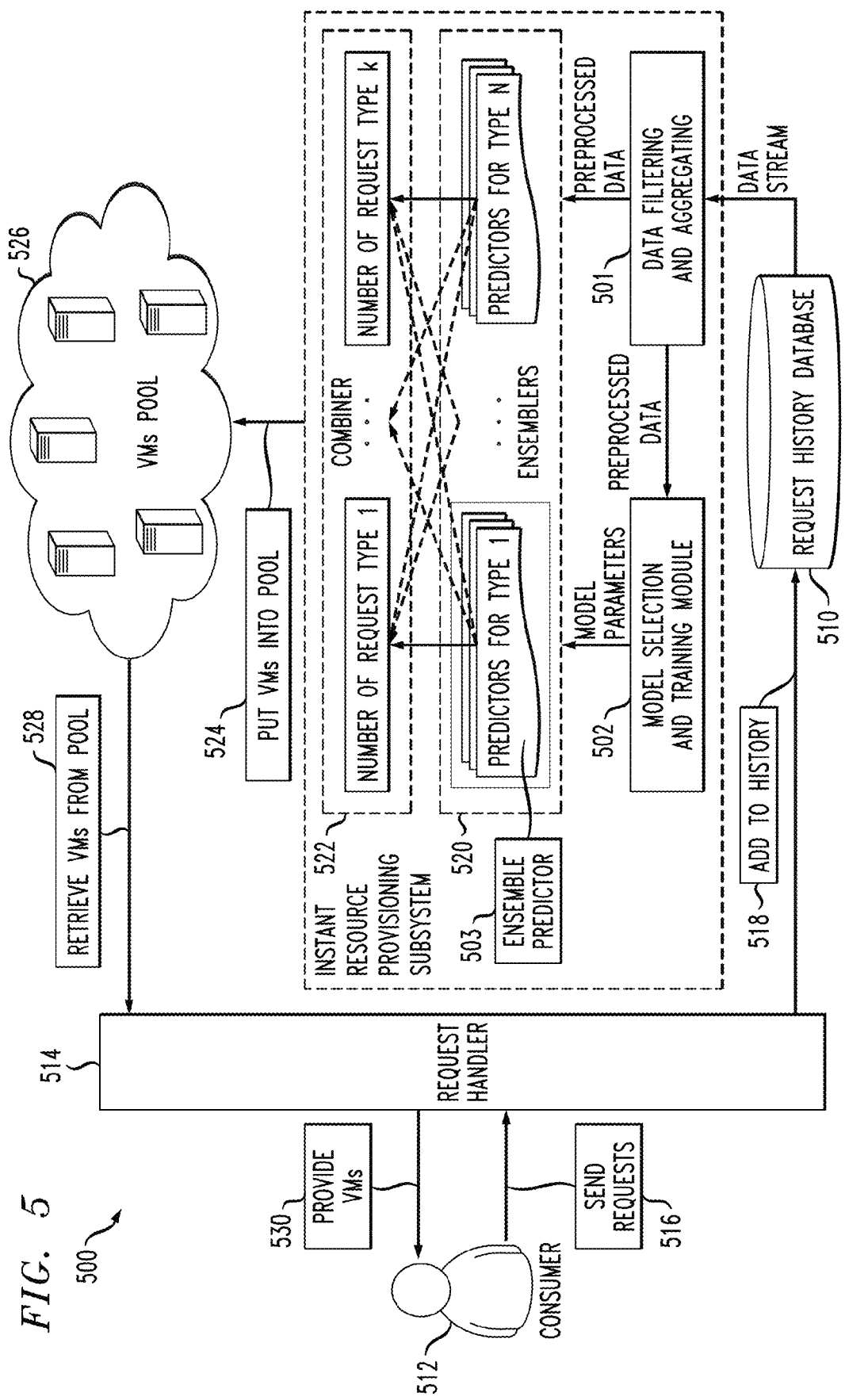
FIG. 5 shows an exemplary system framework, according to an aspect of the invention.

FIG. 5 shows an exemplary system framework, according to an aspect of the invention. To reduce provisioning time, the exemplary embodiment of FIG. 5 provides a real time prediction system 500 that is able to incrementally learn and capture the up-to-date characteristics of provisioning demands over time. As depicted, the system can be divided into three modules, where each module performs one corresponding function as described herein.

The raw data filtering and aggregating module 501 conducts the preprocessing work for the follow-up modules. There are two tasks for this module: (1) filtering out the unnecessary information (including irrelevant features and records) from the raw data stream emanating from request history database 510; and (2) extracting the high-level characteristics of the filtered data and transforming them into time series.

The model generation module 502 is responsible for building the models of the separate predictors. It periodically selects and trains the most suitable models of each predictor based on the latest data feed by the raw data preprocessing module 501. Once the work is finished, the new parameters of the trained models are stored into a particular file and the demand prediction module 503 is notified.

The demand prediction module, which may be implemented, for example, by ensemble predictor 503 together with block 502, reconstructs the prediction models according to the information stored in the model file. It then utilizes the regression ensemble and correlation ensemble, a two-stage ensemble mechanism, to predict the future demand. Please see the discussion of 20, 522 immediately below and the discussion of the prediction ensemble elsewhere herein.

In particular, consumer 512 sends requests to request handler 514 as seen at 516; the same are added to the request history database 510 as seen at 518. The raw data is then provided to module 501 as described above. The data preprocessed by module 501 is then provided to module 502 and to the ensemblers 520 which also obtain the model parameters from module 502. Ensemblers 520 include the appropriate prediction algorithms for different types of VMs. Combiner 522 then combines the predictors as explained in the discussion of the prediction ensemble. As seen at 524 and discussed elsewhere herein, including in connection with FIG. 19, an appropriate number of VMs are placed in pool 526 based on analysis of the predictions; the VMs are retrieved from the pool 526 by request handler 514, as seen at 528, and provided by the handler 514 to the consumer 512, as at 530.

Cloud Prediction Cost

Traditional regression cost measurements, such as mean average error (MAE), least square error (LSE), and mean absolute percentage error (MAPE), are all symmetric measurements and only focus on the absolute accuracy of the regression results. In cloud demand prediction, the consequences of over-prediction and under-prediction are totally different. An over-prediction has no negative effect to the customer and only causes waste of the resources of the cloud service provider, while an under-prediction saves the cost of resources but lowers the service quality of the customer. Furthermore, traditional regression cost measurements are unable to guide predictors to freely change prediction strategy under different system status and service level agreement (SLA) requirements.

Considering the uniqueness of cloud demand prediction, one or more embodiments employ cloud prediction cost (CPC), an asymmetric and heterogeneous cost measurement, to guide the model selection. Beyond the traditional cost-sensitive measurement that treats over-prediction and under-prediction differently, CPC also considers two different kinds of costs: the cost of customer service quality loss and the cost of idled resources.

Suppose for a certain type of VM, the real number of requests (demands) at time t is $v(t)$ and the provisioning number at time t is $\hat{v}(t)$, where $\hat{v}(t)$ (the predicted demand) is a function of the historical values $v(t-1), \ldots, v(t-i)$. Define two functions $T(v(t), \hat{v}(t))$ and $R(\hat{v}(t), \hat{v}(t))$ to represent the cost of service quality and the cost of idled resources, respectively. Cost functions vary for each cloud. One or more embodiments can work with any cost function that satisfies the following two properties:
1) Non-negative: $T(v(t), \hat{v}(t)) \geq 0$ and $R(v(t), \hat{v}(t)) = \geq 0$ for all $v(t)$ and $\hat{v}(t)$.
2) Monotonic: If $v_1(t) - \hat{v}_1(t) \geq v_2(t) - \hat{v}_2(t)$, then $T(v_1(t), \hat{v}_1(t)) \geq T(v_2(t), \hat{v}_2(t))$.
Similarly, if $\hat{v}_1(t) - v_1(t) \geq \hat{v}_2(t) - v_2(t)$, then $R(v_1(t), \hat{v}_1(t)) \geq R(v_1(t), \hat{v}_1(t))$.

Cost of service quality: VM provisioning time is a significant service quality indicator. When a VM provisioning request arrives, if a VM of the same type is already prepared in advance, the system can simply transfer the ownership to the customer and change related records. This only takes a few seconds at most. Denote this short provisioning time as $T_{hit}$, which is similar to a cache "hit" in system cache scenario. If there is no prepared VM to satisfy the customer's request, the VM has to be prepared on-the-fly, which is referred to herein as a "miss." The wait time is denoted as $T_{miss}$. In general, the provisioning time $T_{miss} \gg T$. In current real cloud service systems, the on-the-fly provision time, $T_{miss}$, is tens of minutes for mechanical operations alone. For enterprise clouds, the quality assurance process for software integrity and security may even take days if there are any manual process(es) involved.

One simple form of $T(v(t), \hat{v}(t))$ can be modeled as the total provisioning time of all VMs. In the case of over-prediction, i.e., $v(t) \leq \hat{v}(t)$, all provisioning requests can be immediately fulfilled. In the case of under-prediction, i.e. $v(t) > \hat{v}(t)$, all the under-predicted portion of the VMs need to be prepared on-the-fly. Therefore, the cost of VM provisioning time is:

$$T(v(t),\hat{v}(t)) = \min(v(t),\hat{v}(t))T_{hit} + \max(0,v(t)-\hat{v}(t))T_{miss}, \quad (1)$$

where $T_{miss}$ and $T_{hit}$ are constants. Based on the definition, the longer the provisioning time, the lower the quality.

There are also more sophisticated forms of the T function. For example, common SLAs specify a penalty threshold for provisioning time. There is no penalty for the cloud provider if a request is fulfilled without violating the threshold. In such cases, the service quality cost function has 0-value for provisioning time under the SLA threshold.

Cost of idled resources: This is the non-billable cost of resources including cost of disk space, network bandwidth, electricity, and the labor cost, etc. For simplicity, $R_{vm}$ is used herein to denote the cost of all resources for a single VM. For illustrative purposes, assume the idled resource cost for each VM in a unit time is identical regardless of the type of virtual machine images. To keep the example simple, also assume all VMs are of the same size. Define the cost function for idled resources as:

$$R(v)(t),\hat{v}(t)) = \max(0,\hat{v}(t)-v(t))R_{vm}, \quad (2)$$

where $R_{vm}$ is a constant.

More sophisticated forms of $R(v(t), \hat{v}(t))$ can also be used. For instance, in practice, a fixed amount of resources $R_{fix}$, i.e. the standing resources, are always provided for VM provisioning. If the over-predicted value lies below such threshold, the cost of resources is still 0. Equation (3) shows the form of this cost function:

$$R(v(t), \hat{v}(t)) = \begin{cases} 0 & \text{if } \hat{v}(t) < \min(R_{fix}, v(t)), \\ (\hat{v}(t) - R_{fix})R_{vm} & \text{if } v(t) < R_{fix} < \hat{v}(t), \\ (\hat{v}(t) - v(t))R_{vm} & \text{if } R_{fix} \leq v(t) < \hat{v}(t). \end{cases} \quad (3)$$

Combining Equations (1) and (2), a simple cost function for prediction quality is quantified by Equation (4). All the related notations are listed in the table of FIG. 6.

$$C = \beta T(v(t), \hat{v}(t)) + (1-\beta) \times R(v, \hat{v}(t)) \quad (4)$$
$$= \begin{cases} \beta v(t)T_{hit} + (1-\beta)(\hat{v}(t) - v(t))R_{vm}, & \text{if } v(t) < \hat{v}(t) \\ \beta(\hat{v}(t)T_{hit} + (v(t) - \hat{v}(t))T_{miss}). & \text{if } v(t) \geq \hat{v}(t) \end{cases}$$

The best predictor of cloud resource demand is the one that achieves the minimum total cost between the predicted value $\hat{v}(t)$ and the real value $v(i)$.

Periodical model updating: The philosophy of "train once, predict forever" is not believed to be suitable for cloud VM demand prediction, Due to the unique characteristics of cloud services, the time series of VM type is highly transient. In order to capture the up-to-date characteristics of the time series, one or more embodiments periodically update the prediction models based on the new requests history. For each updating, one or more embodiments utilize grid search strategy and a ten-fold validation method to pick the best parameters combination of each prediction model for each VM type.

Demands Prediction

In one or more embodiments, the core of the demand prediction module is a two-level ensemble technique. The first level is a regression based ensemble that combines the results of different prediction models of the same VM type. The second level ensemble considers the relationship between different VM types, and utilizes their correlation to help improve the robustness of prediction.

Base prediction methods: One or more embodiments employ a set of different prediction techniques as the base predictors. The prediction techniques are listed in the table of FIG. 7.

Prediction ensemble: For the sake of handling the prediction task in a suitable manner, one or more embodiments employ a prediction ensemble method to combine the power of individual prediction techniques.

Because of the discrepancy between the principle of classification and prediction problems, it is not possible to directly utilize the idea of a classification based ensemble method. For classification, the goal is to obtain a more accurate ensemble classifier through majority voting. The performance of the ensemble classifier usually outperforms the base classifiers. For prediction, the goal is to make the ensemble predictor more robust and to make its precision close to the best predictor for different types of time series.

One or more embodiments employ a weighted linear combination ensemble strategy for demand prediction. Suppose the predicted value for predictor $p \in P$ is $\hat{v}_p$ and its corresponding weight at time t is $w_p^{(t)}$, the predicted value for a certain VM type at time t is $$\hat{v}^{(t)} = \sum_p w_p^{(t)} \hat{v}_p, \text{ subject to } \sum_p w_p^{(t)} = 1. \quad (5)$$

Initially (t=0), and thus $$w_p^{(0)} = \frac{1}{|P|}$$

for every predictor p, so the predictors have the same contributions to the combined prediction result.

The weight updating strategy for the prediction-based ensemble is also different from the traditional classification-based strategy. In the classification scenario, the results can only be "correct" or "incorrect." All that is needed is to increase the weights of those correctly classified classifiers for weight updating. However, in the prediction scenario, the results are continuous values and the weight of the predictor would directly affect the ensemble result. Therefore, the updating strategy should be carefully quantified.

One or more embodiments make use of the difference between each predicted value $\hat{v}_p(t)$ and the real value $v(t)$. In order to update the weights, calculate the relative error $e_p^{(t-1)}$ caused by predictor p at time t−1 according to:

$$e^{(t)} = \frac{\sum_p c_p^{(t-1)}}{c^{(t-1)}} w^{(t-1)}, \quad (6)$$

where $c_p^{(t-1)}$ is the prediction cost and can be given by any kind of cost functions, like MAE, LSE, MAPE and CPC (as defined in the cloud prediction cost section above).

Note that in one or more embodiments, the relative errors cannot be used as the new weights of the predictors since they are not normalized. As the final predicted value is the linear combination of all the results of individual predictors, equation (7) is used to make the constraint $$\sum_p w_p^{(t)} = 1 \text{ hold:}$$

$$w^{(t)} = \frac{e^{(t)}}{\sum_p e_p^{(t)}}. \quad (7)$$

It is easy to prove that the weight of the best predictor at each time is guaranteed to be increased by this weight update strategy. Suppose $\bar{c}$ is the average cost of all the predictors at time t−1.

According to Equation (6):

$$\frac{\sum_p c_p^{(t-1)}}{c^{(t-1)}} = \frac{|\mathcal{P}|\sum_p c_p^{(t-1)}}{|\mathcal{P}|c^{(t-1)}} \begin{cases} > \frac{|\mathcal{P}|\sum_p c_p^{(t-1)}}{\sum_p c_p^{(t-1)}} & \text{if } c^{(t-1)} < \bar{c}, \\ < \frac{|\mathcal{P}|\sum_p c_p^{(t-1)}}{\sum_p c_p^{(t-1)}} & \text{if } c^{(t-1)} > \bar{c}. \end{cases}$$

If the cost of a predictor is smaller than the average cost, the increase ratio of $c^{(t-1)}$ is larger than |P|. On the contrary, if the cost of a predictor is larger than the average cost, the increase ratio of $c^{(t-1)}$ is smaller than P. Since normalization preserves the order of weights, those predictors with better-than-average performance become more important (with weights increased) at the next round.

Correlation Ensemble: In a real cloud service scenario, the demands of some VM types may appear to be very irregular. The irregular values would mislead the prediction algorithm when they are used as the training data. In order to mitigate the disturbance of the "noisy" data, one or more embodiments also make use of the correlation information between time series to help prediction. For instance, the demand time series of the same software with a different platform (e.g., 32-bit and 64-bit) are highly correlated.

One or more embodiments use the correlation matrix of time series to help post-process the prediction. Suppose $\Sigma_{(t)}$ is the covariance matrix of the most frequent VMs at time t (e.g., the top 12 time series in the design), $\text{cov}_{ij}^{(t)}$ denotes the covariance between resource types i and its jth correlated resource. By considering the positive influence of the strongly correlated time series (with a correlation larger than 0.8), the prediction value $\hat{u}_i^{(t)}$ of time series i at time t now becomes:

$$\hat{u}_i^{(t)} = \frac{\sum_{j=1}^{k} \text{cov}_{ij}^{(t-1)} s_{ij} \hat{v}_k^{(t)}}{\sum_{j=1}^{k} s_{ij} \text{cov}_{ij}}, \quad (8)$$

where $s_{ij} = \bar{t}_i / \bar{t}_j$ denotes the difference of scale between two time series and k is the number of strongly correlated time series. In one or more exemplary embodiments, only the positively correlated time series are considered.

Reservation Controller: Reservation Controller is a module used in one or more embodiments to communicate with the VM provisioning system. It reserves the unused VMs and only notifies the VM provision system to prepare new VMs when all the reserves of the requested type are used up. The reservation controller provides a good buffer mechanism that effectively reduces the waste of over-prediction.

System Evaluation

The experimental evaluation described herein is based on the real historical VM requests data obtained from a current cloud service platform. The historical demands data contains tens of thousands of VM requests with more than 100 different types. The data is spread over more than 3 months.

The goal of the evaluation is to answer the following questions:

What is the best strategy for demand prediction?
Whether the ensemble method is more robust and effective than separate prediction techniques?
To what extent can one or more embodiments decrease the provisioning time and how much idled resources can be caused by one or more embodiments?
Whether the cloud prediction cost is practical and flexible for cloud demand prediction?

Data Filtering and Aggregating

Data preprocessing is the first step of demand prediction—see discussion of module 501 above. The raw request records in the data stream cannot be directly used for demand prediction for two reasons:

(1) No prediction algorithm is able to build a model directly on the low-level representation.
(2) The raw data contains either useless request records or irrelevant features that can cause the prediction to be imprecise.

Not all the 21 features of the request record are useful. In one or more embodiments, only VM Type, which illustrates the type of VM the customer requests; and Request Timestamp, which indicates the time that the customer sends the request, are considered.

Figure 8:
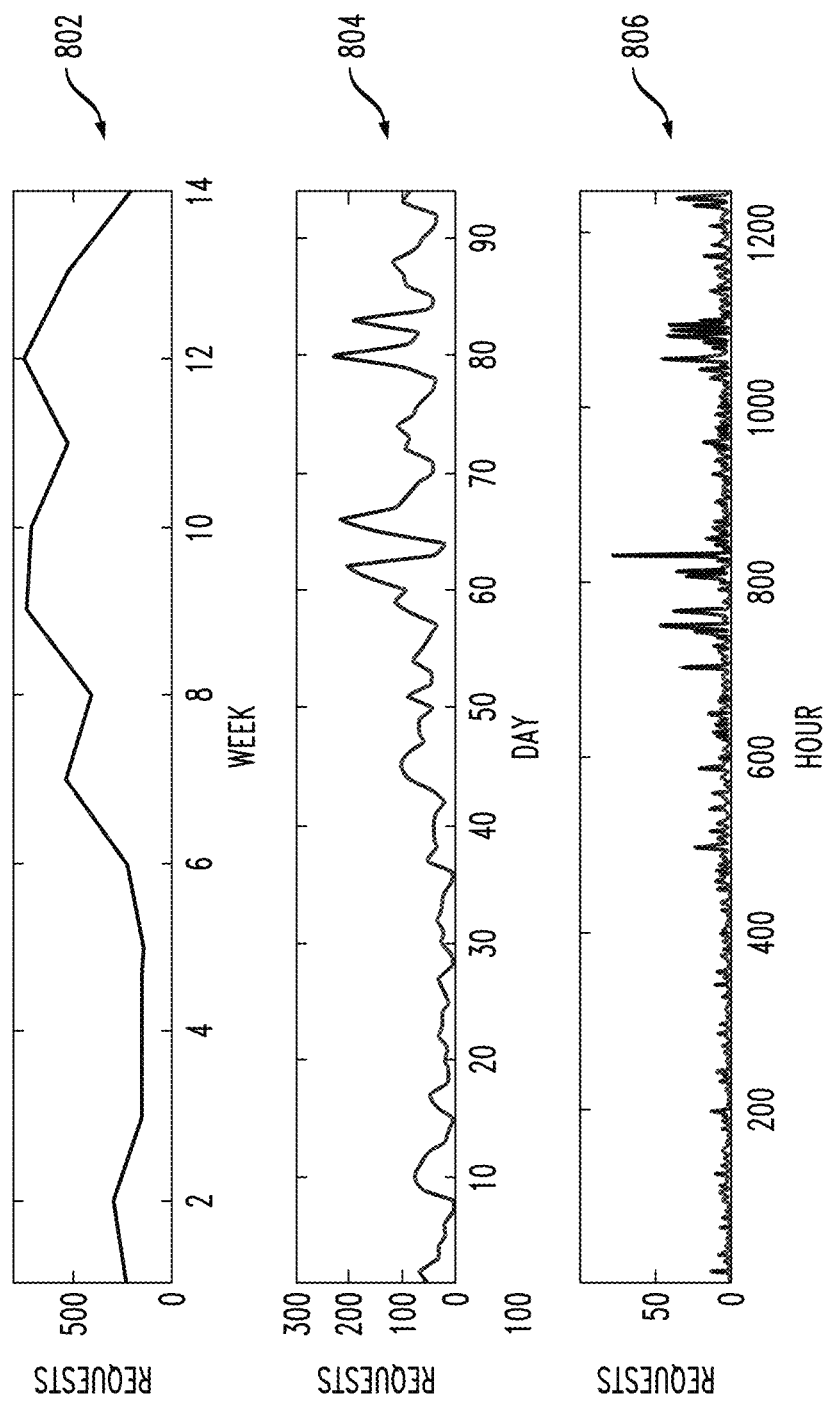
FIG. 8 shows the time series of the same VM type in weeks, days and hours.

Time Series Aggregation Granularity: The set of time series is generated by aggregating the request records via the VM types and request timestamps. For the request timestamp, the aggregation can be conducted with different granularities. FIG. 8 shows the time series of the same VM type in weeks, days and hours; that is, time series with different granularities (normalized data). The top one 802 is aggregated weekly, the middle one 804 is aggregated daily, the bottom one 806 is aggregated hourly.

It is trivial to know that the coarser the granularity, the larger the demand in each time slot. If the time series is aggregated at a coarse granularity, e.g. weekly, it requires the system to prepare too many VMs and most of the prepared VMs will be idle for a long time. Moreover, compared with finer granularity, even a smaller portion of over-prediction would cause larger idled resources.

On the contrary, aggregation at a fine granularity, e.g. hourly, would make the time series lack statistical significance and be difficult to predict.

Figures 9, 10:
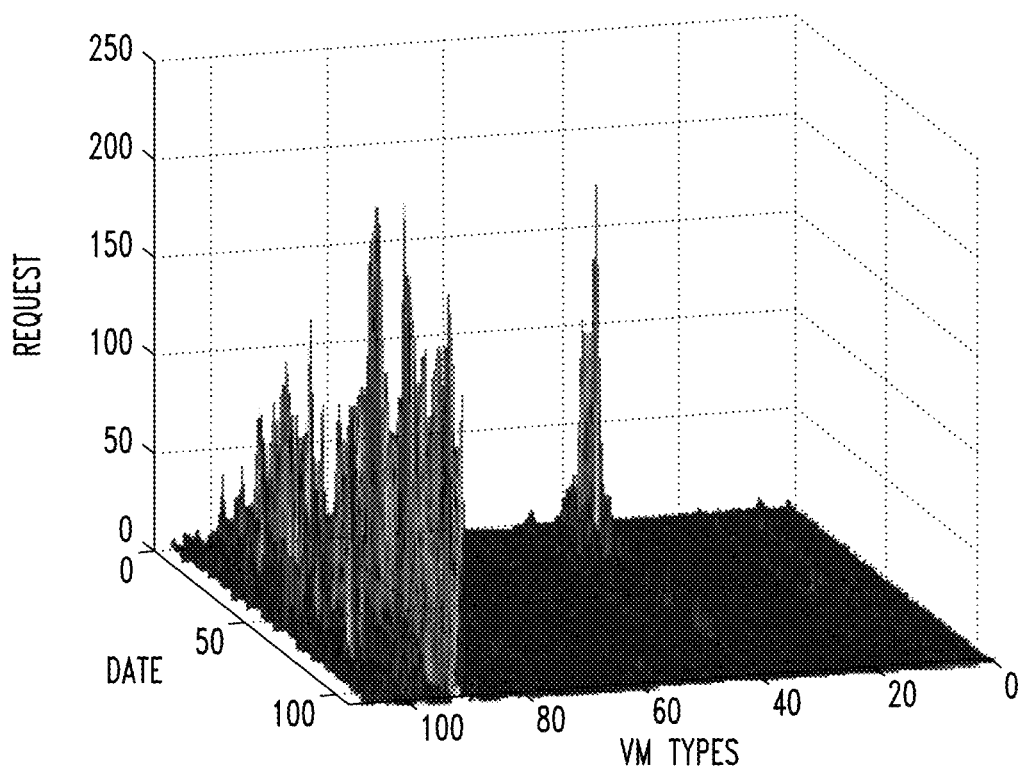
FIG. 9 presents a table with characteristics of VM demand time series under Coefficient of Variance (CV), skewness, and kurtosis.
FIG. 10 shows request distribution in a Time-Type-Count View.

The table of FIG. 9 illustrates the characteristics of VM demand time series under Coefficient of Variance (CV), skewness, and kurtosis, three statistics to measure the shape of time series. While it is believed that the skilled artisan will be familiar with CV, skewness, and kurtosis, reference is nevertheless made to David Moore and George McCabe, Introduction to the Practice of Statistics, W. H. Freeman and Company, expressly incorporated herein by reference in its entirety for all purposes. Higher CV value indicates larger volatility, higher skewness indicates stronger asymmetry, and higher kurtosis means more of the variance is the result of infrequent extreme deviations. In the comparison, the time series aggregated hourly has the largest values in all three measures, indicating the hour granularity is also not suitable for aggregating. Hence, in later experiments, aggregation was performed daily.

Figure 11A:
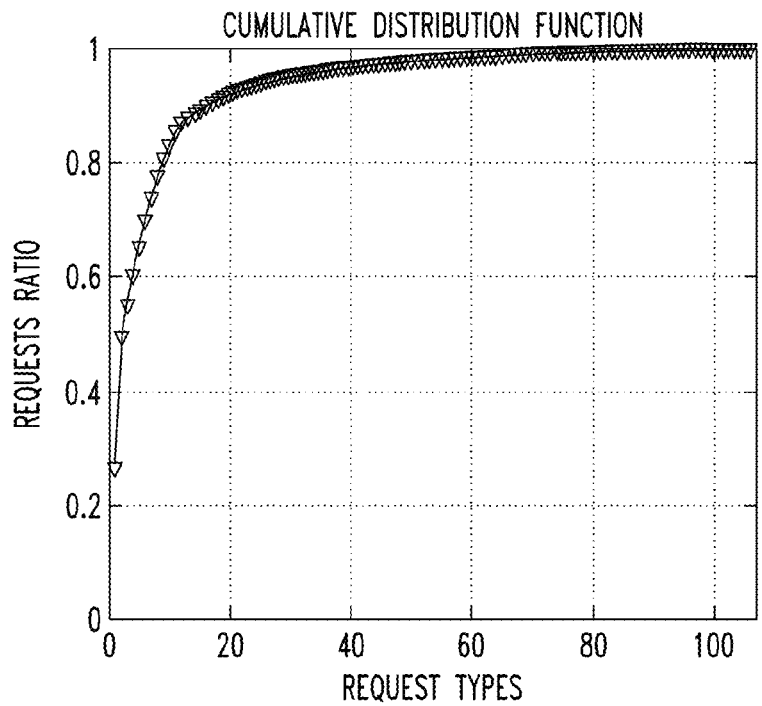
FIG. 11A plots the corresponding cumulative distribution function (CDF) and FIG. 11B ranks the VM based on their requests frequency.
Figure 11B:
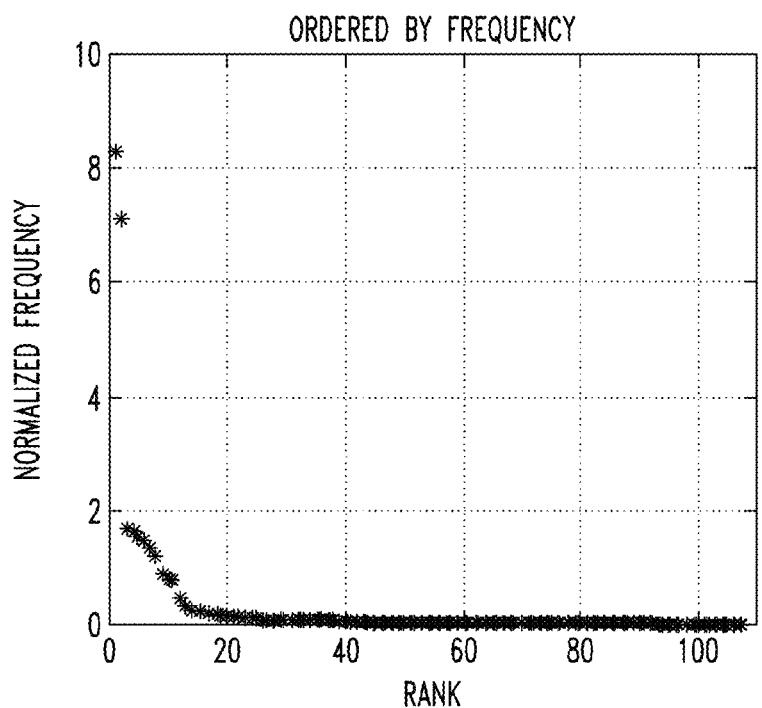

VM Type Selection: FIG. 10 shows Request Distribution in a Time-Type-Count View (normalized data); that is to say, the distribution of VM types over time. Two pertinent characteristics are illustrated by FIG. 10; namely, the distribution of VM requests is highly uneven as a small number of the VM types dominate the distribution. FIGS. 11A and 11B present a CDF plot and the request frequency plot (normalized data); in particular, FIG. 11A plots the corresponding cumulative distribution function (CDF) and FIG. 11B ranks the VM based on their requests frequency. The CDF shows that the VM requests obey the 80/20 rule; that is, more than 80% of the requests concentrate on less than 20% of VM types. In the ranking plot, observe that there is an inflection point between the 12th and 13th types, which explicitly divides the types into frequent and infrequent groups. Measurements such as Coefficient of Variance, Skewness and Kurtosis on these minority time series also show higher values than those on majority time series, indicating that the time series of these minority types are not regular enough to be modeled and predicted. Note, however, that this does not mean that nothing can be done to shorten the provisioning time for infrequent VM types.

Based on the results of the above studies, the data filtering and aggregating module was designed to periodically check the change of rank, and to only filter the top twelve frequent types to generate their corresponding time series. For those minority VM types, it is always possible to use naive strategies, e.g. prepare a fixed number of VMs for each infrequent VM type. Since these VM types are infrequent, the cost of prediction error is insignificant.

Prediction Precision

The prediction performance of different base predictors was compared with an exemplary embodiment of an ensemble predictor, according to an aspect of the invention. Besides the inventive cost function CPC, MAE, MSE and MAPE were also used to measure the precision of these predictors. For the parameters of CPC, set $\beta=0.5$ (treat the cost of provisioning time and the cost of idled VMs equally), $T_{miss}=1040$ (if one VM is not prepared in advance, the customer needs to wait for more than 10 minutes), $T_{hit}=5$ (if one VM is prepared, the customer can get it in 5 seconds), $R_{vm}=400$ (the cost of one idled VM).

In order to evaluate the robustness of the predictor, the time series of the top twelve (before the inflection point in FIG. 11B) most frequent VM types were picked for experiments. All the time series are horizontally (along the time axis) partitioned into two sets, the time series of last 30 days are used as the test dataset, while the remaining requests are used as the training set. For base predictors, grid search strategies are used to seek the best parameter combinations.

The table of FIG. 13 shows the precision of all the predictors on all the time series. To avoid clutter, only the details of the top three time series are listed; namely, Red Hat Enterprise Linux 5.5 32-bit version 1302, Red Hat Enterprise Linux 5.5 64-bit version 1304, and SUSE Linux Enterprise Server 1306, and the average CPC 1308 of all the time series. It can be seen that the best predictor is different for different VM types. For example, GEP performs the best on the 1st VM type 1302; while ANN and GEP achieve good results on the 2nd VM type 1304 and the 3rd VM type 1306, respectively. Moreover, the winner predictor of one VM type can also perform badly for other VM types. For example, ANN obtains poor performance on the 1st VM type 1302.

In one or more embodiments, for the ensemble predictor, although it does not perform the best on any single VM type, it is very robust as its performance is always close to the winner predictor on all the types. The average CPC shows that the ensemble predictor has the best average performance, indicating its self-adaptation capability.

Figure 14B:
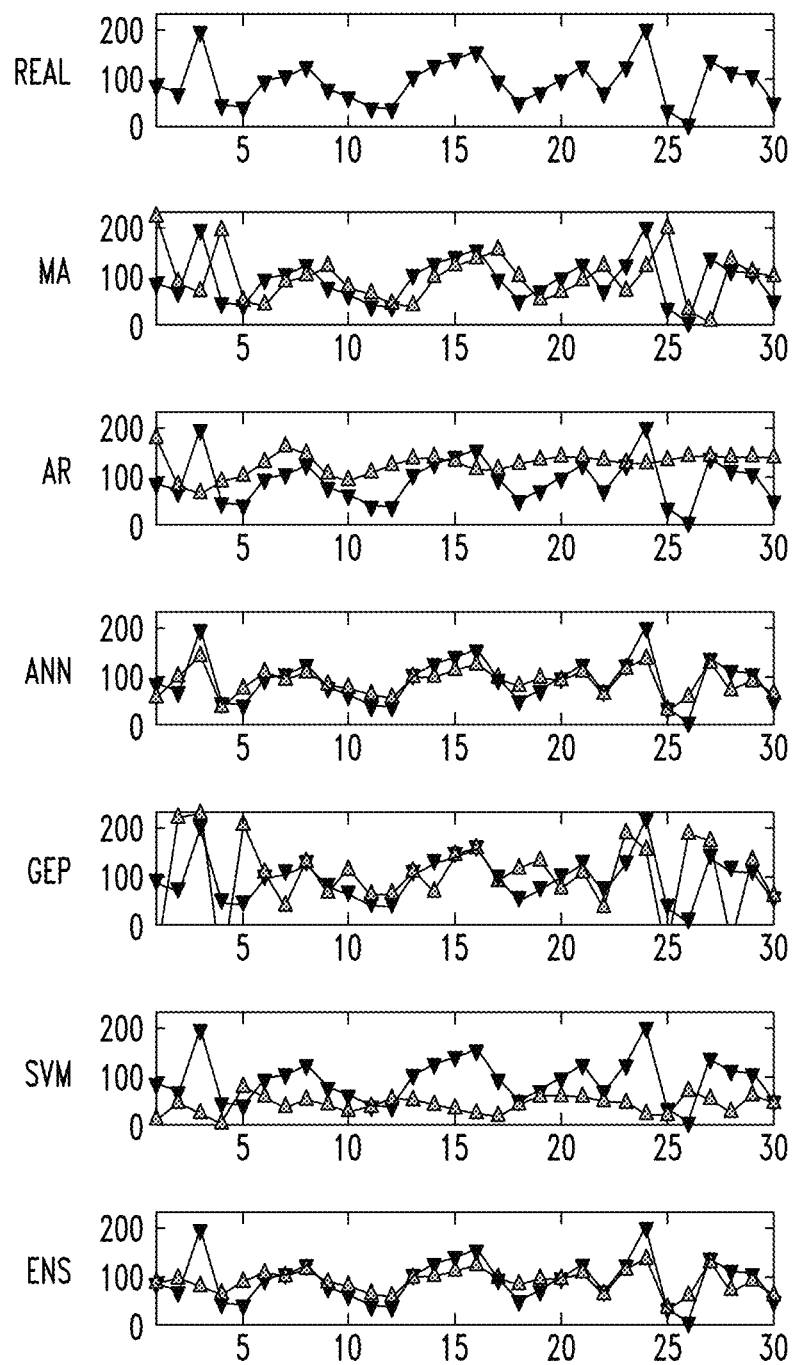

FIGS. 14A-14C display the real time series of the three most frequent VM types and the corresponding prediction results of all the predictors. In this figure, the ensemble predictor can always identify the best predictor for the time series and quickly converge to it. Since under-prediction is worse than over-prediction in the cloud provision scenario, the predictor that rarely under-predicts the demand is considered better than the one whose outputs are always close to the real demands. It can also be noted that although MA and SVM do not have the best performance in any of the three VM types, they can also make contributions to the ensemble predictor according to their weights.

In particular, in FIGS. 14A-14C, prediction results on testing data of the three most frequent time series are presented (normalized data). From top to bottom, the time series are: the real time series (Real); time series predicted by MA; time series predicted by AR; time series predicted by ANN; time series predicted by GEP; time series predicted by SVM; and time series predicted by ensemble (ENS) technique in accordance with one or more aspects of the invention.

Detail Cost

Provisioning time reduction: A significant criteria in performance evaluation is how much provisioning time can be saved. One or more embodiments calculate the proportion of saved time obtained by predictors based on equation (9), where the T function is calculated according to Equation (1):

$$P_{save} = \frac{\sum_{t}(v(t)T_{miss} - T(v(t), \hat{v}(t)))}{\sum_{t} v(t)T_{miss}}. \tag{9}$$

Figure 12A:
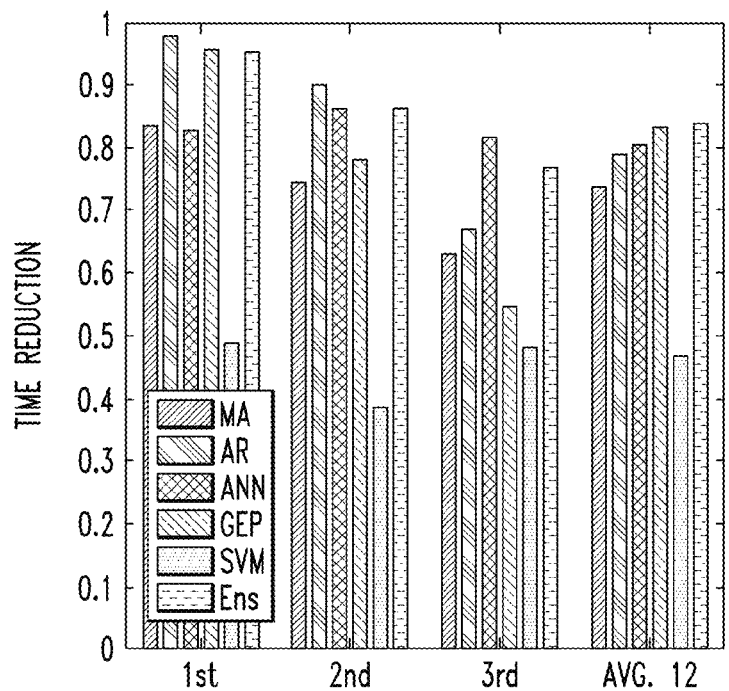

FIG. 12A shows the proportion of time saved for each predictor. It can be seen that most of the predictors can significantly decrease more than 60% of the provisioning time. However, in the presence of large variations across time series, the saved time achieved by the predictor is not stable for different VM types. On average, the ensemble predictor performs the best due to its strong self-adaptation ability.

Figure 12B:
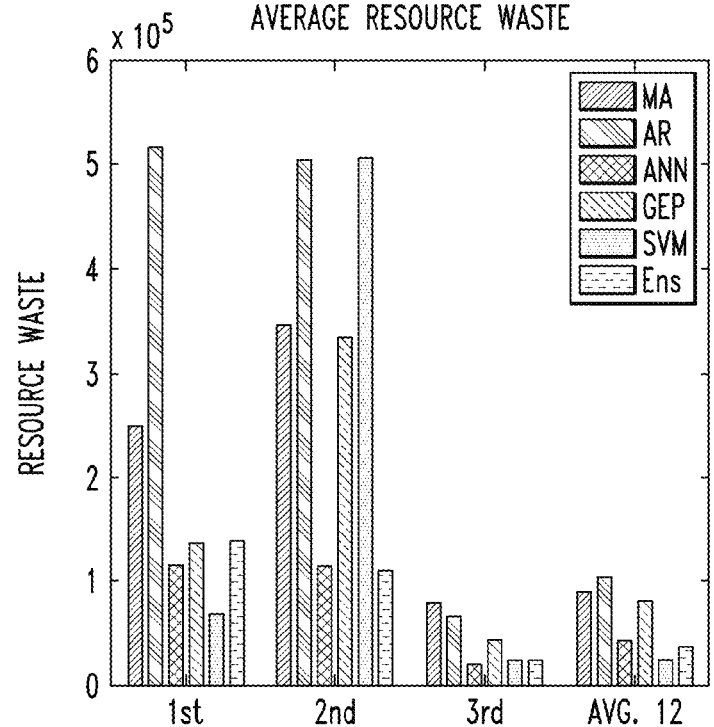

Idled resources: The cost of idled resources is another evaluation criterion of the quality of prediction. It is true that an always over-predicted predictor can save a lot of provisioning time, but such a predictor would also waste a lot of resources. FIG. 12B shows the amount of idled resources caused by each predictor. On average, the best resource saver is SVM, but its performance in time reduction is the worst. GEP achieves a good performance on time reduction, but it wastes the resources twice as much as techniques in accordance with one or more embodiments of the invention.

Comparison of Different Cost Measurements

The table of FIG. 15 shows the time reduction and the idled resources of the ensemble predictor guided by various cost measurements. CPC clearly outperforms the other three cost measurements in provisioning time reduction. Note also that CPC has the largest idled resources. Such phenomenon can be well interpreted by the basic idea of these cost measurements. MAE, MSE and MAPE are all symmetric cost measurements and they guide the ensemble predictor to equally weight the under-predictors and over-predictors. While CPC gives more penalty to under-predictors than over-predictors, the ensemble predictor always prefers to give larger weights to the over-predictor, which results in more time reduction and also more likely waste of resources. As in the cloud service scenario, customer service quality is much more important, and it is worth reducing the provisioning time on the costs of a reasonable amount of idled resources.

Reservation Controller

The table of FIG. 16 shows the ratio of provisioning time reduction that can be achieved by incorporating the reservation controller. For all the time series, the reservation controller further improves the reduction of the average provisioning time from 83.79% to 94.22%. Moreover, with the assistance of the reservation controller, the over-prediction portion of the VMs prepared before can be used for following days without going through the provisioning process again.

Effect of β

Figure 17:
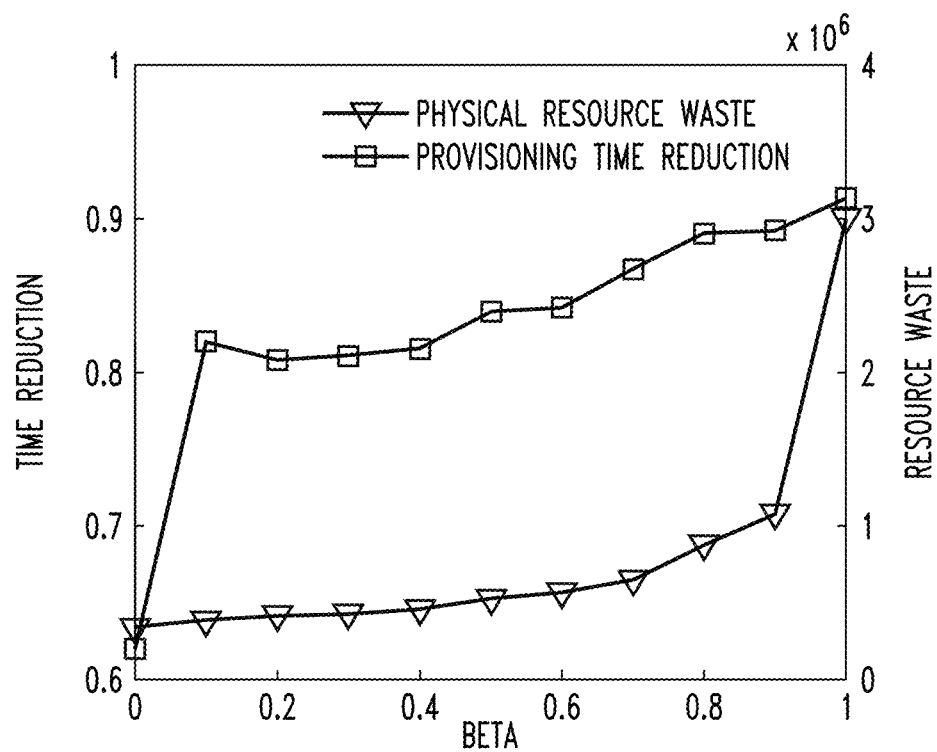
FIG. 17 illustrates the effect of $\beta$.

As mentioned before, the parameter β used to tune the importance between cost of service quality and that of idled resources. A higher β leads the ensemble predictor to assign larger weight to the over-predictor. The time reduction/idled resources curve in FIG. 17 illustrates how β affects the balance between these two factors. As expected, when β increases, both the ratios of time reduction and the idled resource increase. When β equals 0, the ratio of average provisioning time reduction is quite limited. This is because the cost of service quality loss is totally ignored, and the ensemble method predicts the demands very pessimistically. When β equals 1, the cost of idled resources is huge but the average provisioning time reduction is the highest.

This experimental result confirms that β is an effective parameter to set the trade-off between the service quality loss and the cost of idled resources. In practice, β can be dynamically tuned whenever needed.

Effect of Sophisticated Cost Functions

Figure 18:
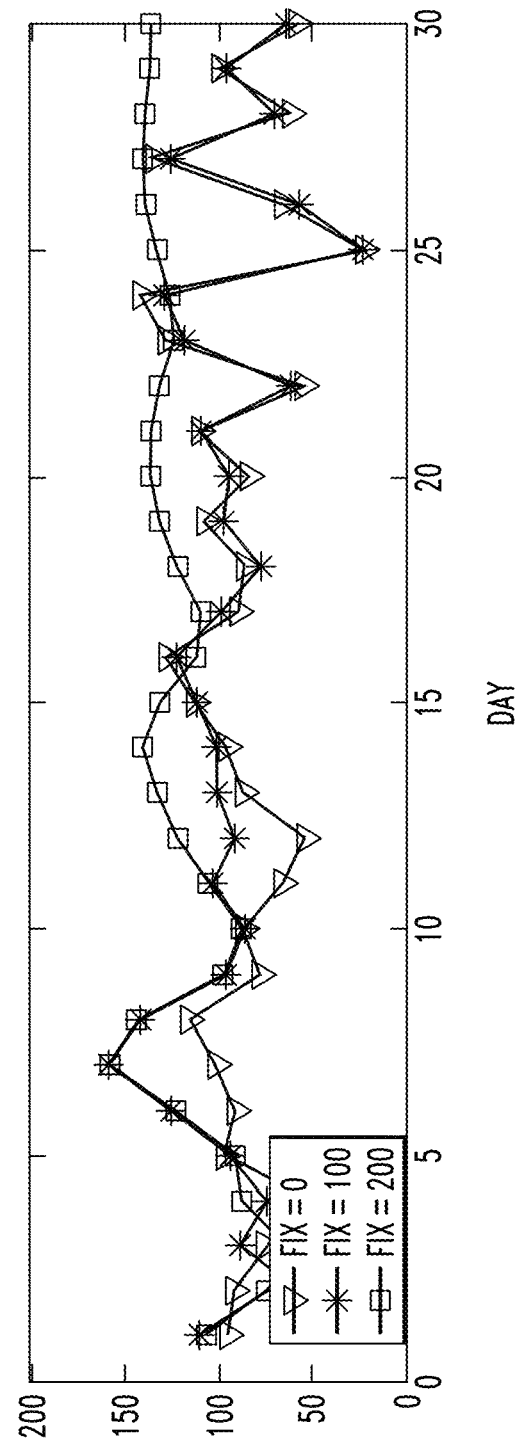
FIG. 18 illustrates the influence of $R_{fix}$ on prediction (using normalized data)

As mentioned in the section on cloud prediction cost, the framework in accordance with one or more embodiments is flexible and can use different cost functions to guide the prediction process. Consider how the predicted demand time series is influenced by the use of cost functions defined in Equation (3). The only parameter in equation (3) is $R_{fix}$, which indicates the amount of standing resources. FIG. 18 shows three predicted demand time series time generated by different $R_{fix}$ values. As $R_{fix}$ increases, the predicted demand tends to be more optimistic rather than pessimistic. Experimental results show that the average provisioning time is reduced by 93.94% when $R_{fix}$ increases to 200, but the amount of idled resources becomes huge.

Recapitulation and Discussion of Additional Aspects

It is worth noting that previous work on data mining on computer system data generally requires that the patterns of normal behaviors are well defined and the analysis is based on relatively static and stable environments. On the other hand, one or more embodiments of the invention address the presence of the unstable customer constituency and volatile demand, such that prior art methods cannot be directly used for request prediction. Furthermore, previous techniques for time series prediction are typically not able to handle all the prediction tasks required in some applications of one or more embodiments of the invention, due to the transient environment, whereas one or more embodiments employ a regression-based ensemble method to combine the prediction results of these techniques. In addition, it should be noted that one or more embodiments, rather than predicting the resource usage within VMs, predict the VM demand of the whole cloud.

The idea of on-demand computing leads to the popularity of cloud computing, However, current cloud computing has not yet truly achieved the goal of providing instant elasticity. Tens of minutes of mechanical processing and hours of manual operation present a serious obstacle toward on-the-fly virtual machine provisioning. One or more embodiments employ data mining to enable an entirely new type of service.

One or more embodiments provide techniques for reducing the customer waiting time for VM provisioning. Aspects include an instant resource provisioning system to handle the cloud VM demand prediction. Due to the unique cost structure of cloud services, one or more embodiments utilize cloud prediction cost to measure the performance of the prediction model. Moreover, one or more instances employ a two-level ensemble method to make the prediction results robust and burst-tolerant. A series of experiments demonstrate that one or more exemplary embodiments of a prediction system in accordance with an aspect of the invention can effectively reduce the customer waiting time for VM while not causing much idled resources.

Figure 19:
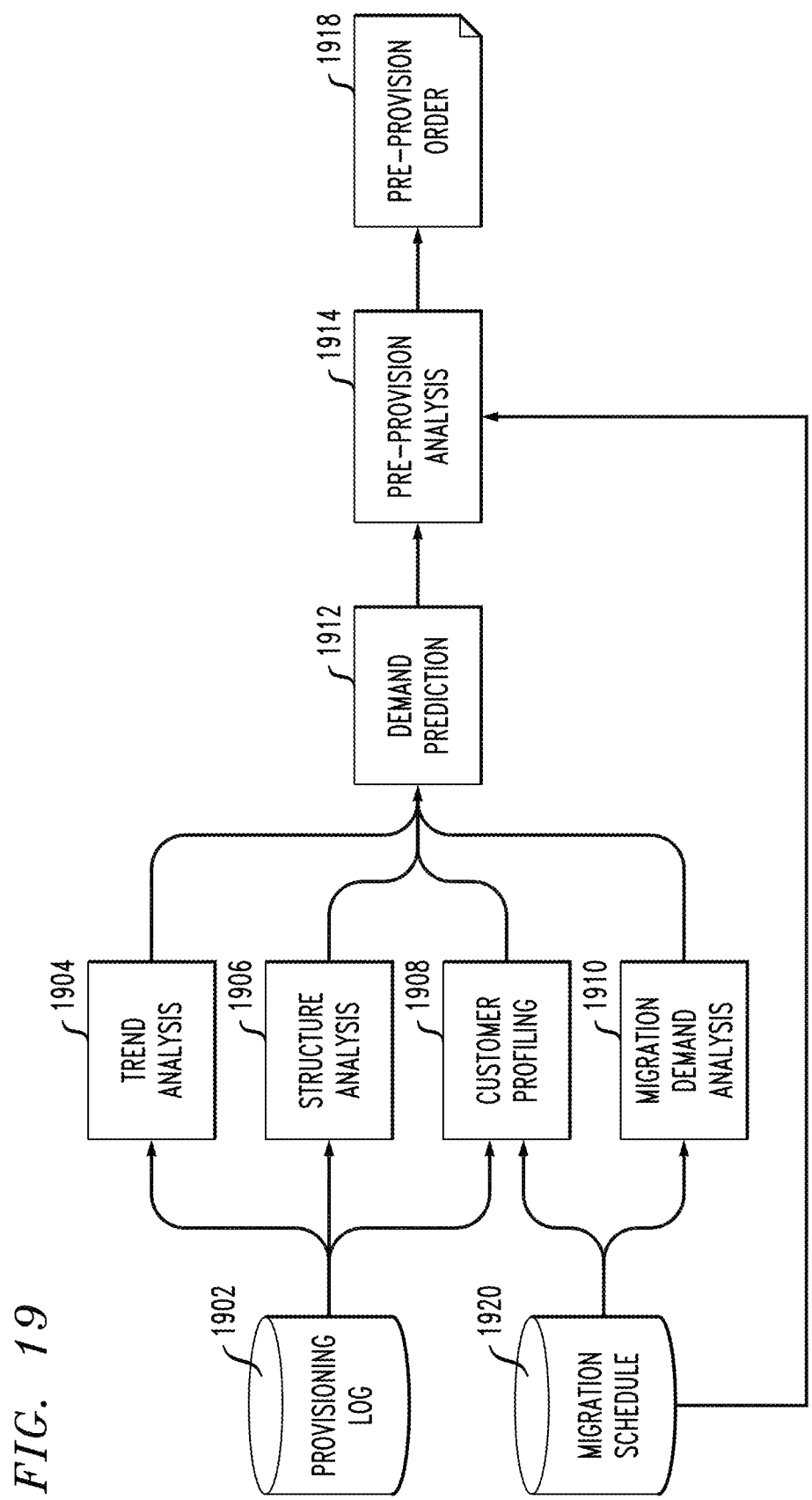
FIG. 19 shows exemplary pre-provisioning decision steps, according to an aspect of the invention.

FIG. 19 depicts exemplary pre-provisioning decision steps. Historical data regarding what VM has been requested by what customer is stored in provisioning log database 1902. Furthermore, new customers may provide information regarding when they will migrate workloads from an existing environment to a cloud environment provided by a cloud services provider. This schedule data regarding future migrations may be stored at 1920. Trend analysis module 1904 uses appropriate techniques to, for example, determine that a given type of VM is being requested ten times per day with a growth rate of so many VMs per unit time. Structure analysis module 1906 determines the images associated with a given application; for example, a shopping web site application may be a three-tier structure with a web server in front interfacing with the customer; an application server behind the web server to execute the business logic; and one or more databases. Each tier may have multiple instances. Customer profiling module 1908 allows for classification of customers by technology and type; for example, a customer may use WINDOWS systems and may be testing the cloud environment or may be committed to the cloud environment. Modules 1904, 1906, 1908 all take input from provisioning log 1902. Module 1908 also takes input from migration schedule 1920. Migration demand analysis module 1910 uses customers' migration schedule 1920 to predict future demand that is not predictable by the customers' historical data. This happens mainly on new customers and customers that are planning to migrate a significant amount of workload into the cloud.

Demand prediction module 1912 aggregates all the input analyses to predict the images needed in future time periods. Demand prediction module 1912 aggregates all the analyses of elements 1904, 1906, 1908, and 1910 and utilizes a two-level time series ensemble mechanism to predict the future demand. The first ensemble level employs a set of distinct time series predictors such as SVM (Support Vector Machine), Artificial Neural Network and ARMA (Auto-regression moving average), and then combines their output; the second ensemble level uses the correlation information of different image types to get the final predicted demand. Pre-provisioning analysis module 1914 determines, based on the predicted demand and migration schedule 1920, what VMs to pre-provision and what to do with already-provisioned VMs when projected demand changes, and issues a pre-provisioning order 1918 to effectuate same; this order may be sent to a suitable pre-provisioning engine.

Given the discussion thus far, it will be appreciated that, in general terms, an exemplary method, according to an aspect of the invention, includes the step of extracting high level characteristics from a virtual machine provisioning request stream for a cloud computing environment; see, e.g., the discussion of steps and elements 516, 514, 518, 510, and 501 in FIG. 5. Also included is the step of generating a plurality of prediction models for a plurality of different types of virtual machines. See, e.g., the discussion of elements 502 and 503 in FIG. 5. A further step includes applying a regression-correlation ensemble to appropriate ones of the prediction models to predict future virtual machine demand for the cloud computing environment. See, e.g., the discussion of elements 520, 522 in FIG. 5 and block 1912 in FIG. 19.

In some cases, a further step includes pre-provisioning a plurality of virtual machines in the cloud computing requirement in accordance with the predicted future virtual machine demand. See, e.g., the discussion of steps or elements 524, 526, 528, 514, 530 in FIG. 5 and blocks 1914, 1918 in FIG. 19.

In one or more embodiments, the extracting 501 includes filtering irrelevant features and records and transforming the high level characteristics into time series. In some instances, the filtering filters out characteristics other than virtual machine type and request time.

In some cases, the generating step is carried out based on an asymmetric cost measurement that treats under-prediction and over-prediction costs differently; in a preferred but non-limiting approach, the generating step is carried out based on cloud prediction cost. Cloud prediction cost is defined as the cost function of Equation (4) herein.

As noted, in some embodiments, the extracting and generating steps are repeated as the virtual machine provisioning request stream moves forward in time.

In one or more instances, the applying step includes combining a plurality of the prediction models via a weighted linear combination to obtain an intermediate prediction; and post-processing the intermediate prediction via correlation between positively correlated ones of the time series to obtain the predicted future virtual machine demand. Refer to the above discussion of the prediction ensemble and correlation ensemble.

As discussed in connection with the reservation controller, in some cases, an additional step includes reserving idle ones of the pre-provisioned virtual machines in the cloud computing requirement in accordance with the predicted future virtual machine demand.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable. RE, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, any one, some, or all of the modules, sub-modules, and/or databases depicted in FIGS. 5 and 19. The method steps can then be carried out using the distinct software modules and/or sub-modules of the system, as described above, executing on one or more hardware processors 16. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    extracting high level characteristics from a virtual machine provisioning request stream for a cloud computing environment;
    generating a plurality of prediction models for a plurality of different types of virtual machines;
    applying a regression-correlation ensemble to appropriate ones of said prediction models to predict future virtual machine demand for said cloud computing environment; and
    providing a system, wherein the system comprises distinct software modules, each of the distinct software modules being embodied on a computer-readable storage medium, and wherein the distinct software modules comprise a raw data filtering and aggregating module, a model generation module, and a demand prediction module;
    wherein:
        said extracting is carried out by said raw data filtering and aggregating module executing on at least one hardware processor;
        said generating is carried out by said model generation module executing on said at least one hardware processor; and
        said applying is carried out by said demand prediction module executing on said at least one hardware processor.

2. The method of claim 1, further comprising pre-provisioning a plurality of virtual machines in said cloud computing requirement in accordance with said predicted future virtual machine demand.

3. The method of claim 2, wherein said extracting comprises filtering irrelevant features and records and transforming said high level characteristics into time series.

4. The method of claim 3, wherein said filtering filters out characteristics other than virtual machine type and request time.

5. The method of claim 3, wherein said generating step is carried out based on an asymmetric cost measurement that treats under-prediction and over-prediction costs differently.

6. The method of claim 5, wherein said generating step is carried out based on cloud prediction cost.

7. The method of claim 3, further comprising repeating said extracting and generating steps as said virtual machine provisioning request stream moves forward in time.

8. The method of claim 3, wherein said applying step comprises:
    combining a plurality of said prediction models via a weighted linear combination to obtain an intermediate prediction; and
    post-processing said intermediate prediction via correlation between positively correlated ones of said time series to obtain said predicted future virtual machine demand.

9. The method of claim 3, further comprising reserving idle ones of said pre-provisioned virtual machines in said cloud computing environment in accordance with said predicted future virtual machine demand.

10. An apparatus comprising:
    a memory;
    at least one processor, coupled to said memory, and operative to:
        extract high level characteristics from a virtual machine provisioning request stream for a cloud computing environment;
        generate a plurality of prediction models for a plurality of different types of virtual machines; and
        apply a regression-correlation ensemble to appropriate ones of said prediction models to predict future virtual machine demand for said cloud computing environment; and
    a plurality of distinct software modules, each of the distinct software modules being embodied on a computer-readable storage medium, and wherein the distinct software modules comprise a raw data filtering and aggregating module, a model generation module, and a demand prediction module;
    wherein:
        said at least one processor is operative to extract by executing said raw data filtering and aggregating module;
        said at least one processor is operative to generate by executing said model generation module; and
        said at least one processor is operative to apply by executing said demand prediction module.

11. The apparatus of claim 10, wherein said at least one processor is further operative to pre-provision a plurality of virtual machines in said cloud computing requirement in accordance with said predicted future virtual machine demand.

12. The apparatus of claim 11, wherein said at least one processor is operative to extract said high level characteristics by filtering irrelevant features and records and transforming said high level characteristics into time series.

13. The apparatus of claim 12, wherein said at least one processor is operative to filter by filtering out characteristics other than virtual machine type and request time.

14. The apparatus of claim 12, wherein said at least one processor is operative to generate said plurality of prediction models based on an asymmetric cost measurement that treats under-prediction and over-prediction costs differently.

15. The apparatus of claim 14, wherein said at least one processor is operative to generate said plurality of prediction models based on cloud prediction cost.

16. The apparatus of claim 12, wherein said at least one processor is further operative to repeat said extracting and generating as said virtual machine provisioning request stream moves forward in time.

17. The apparatus of claim 12, wherein said at least one processor is operative to apply said regression correlation ensemble by:
   combining a plurality of said prediction models via a weighted linear combination to obtain an intermediate prediction; and
   post-processing said intermediate prediction via correlation between positively correlated ones of said time series to obtain said predicted future virtual machine demand.

18. The apparatus of claim 12, wherein said at least one processor is further operative to reserve idle ones of said pre-provisioned virtual machines in said cloud computing environment in accordance with said predicted future virtual machine demand.

* * * * *